United States Patent
Skinner et al.

(10) Patent No.: US 8,518,336 B2
(45) Date of Patent: Aug. 27, 2013

(54) CASCADING PLANAR BAFFLE REACTOR

(75) Inventors: Kenneth Michael Skinner, Knoxville, TN (US); Arthur L. Lucas, III, Proctorville, OH (US)

(73) Assignee: Mid-Atlantic Technology, Research & Innovation Center, Inc., South Charleston, WV (US)

( * ) Notice: Subject to any disclaimer, the term of this patent is extended or adjusted under 35 U.S.C. 154(b) by 91 days.

(21) Appl. No.: 13/012,703

(22) Filed: Jan. 24, 2011

(65) Prior Publication Data
US 2011/0206571 A1 Aug. 25, 2011

Related U.S. Application Data

(60) Provisional application No. 61/336,581, filed on Jan. 25, 2010, provisional application No. 61/398,281, filed on Jun. 24, 2010.

(51) Int. Cl.
 *B01J 19/18* (2006.01)
 *B01J 8/08* (2006.01)

(52) U.S. Cl.
 USPC ............................ 422/228; 422/205; 422/233

(58) Field of Classification Search
 USPC .......................................... 422/205, 228, 233
 See application file for complete search history.

(56) References Cited

U.S. PATENT DOCUMENTS

| | | | |
|---|---|---|---|
| 4,117,786 A | 10/1978 | Brose | |
| 4,243,489 A | 1/1981 | Green | |
| 4,341,598 A | 7/1982 | Green | |
| 4,648,328 A | 3/1987 | Keough | |
| 5,165,908 A | 11/1992 | Van Slooten et al. | |
| 5,411,714 A | 5/1995 | Wu et al. | |
| 5,792,340 A | 8/1998 | Freel et al. | |
| 6,416,721 B1 | 7/2002 | Sanjurjo et al. | |
| 7,293,511 B2 * | 11/2007 | Prigmore et al. | 110/341 |

FOREIGN PATENT DOCUMENTS
WO WO8700258 4/1986

* cited by examiner

*Primary Examiner* — Walter D Griffin
*Assistant Examiner* — Lessanework Seifu
(74) *Attorney, Agent, or Firm* — Dinsmore & Shohl, LLP; Monika J. Hussell, Esq.

(57) ABSTRACT

The present invention provides for a thermo-chemical reactor vessel having a plurality of planer baffles with an offset and opposing orientation affixed to the interior sides of the vessel. The materials which are to be processed enter the reactor from the top and move downward by gravity and the rate of movement is controlled by the internal configuration of the plurality of planar surfaces. The slope angle of said plurality of planar baffles can be controlled from outside of the vessel. Further, the angle of the interior planar baffles can be changed from horizontal to near vertical. Still further, the plurality of planar baffles can be vibrated using pulsed gas released from beneath the baffle.

11 Claims, 2 Drawing Sheets

CASCADING PLANAR BAFFLE REACTOR

REFERENCE TO PENDING APPLICATIONS

This application claims the benefit of U.S. Provisional Patent Application Ser. No. 61/336,581 filed on Jan. 25, 2010 and entitled Cascading Planar Baffle Pyrolysis Reactor Design and U.S. Provisional Patent Application Ser. No. 61/398,281 filed on Jun. 24, 2010 and entitled Pyrolysis Reactor Heating Design.

REFERENCE TO MICROFICHE APPENDIX

This application is not referenced in any microfiche appendix.

BACKGROUND OF THE INVENTION

1. Field of the Invention

The present invention is generally directed toward an apparatus and method for the refinement of waste materials into biological based fuels. More specifically, the present invention is directed toward the thermo-chemical conversion of woody biomass, switch grass, crop residues and various waste materials into combustible gas and/or precursor liquids for subsequent refinement into biological based fuels.

2. Background

Thermo-chemical conversion of biomass and waste materials through a process is seen as a transformational technology in producing economical quantities of biofuels that can displace imported fossil fuels. In the near future, an economic and efficient pyrolysis processes involving conversion of low value woody biomass, crop residues, and waste materials will be of increasing national economic and security interest.

Thermo-chemical conversion of biomass and waste materials through a pyrolysis process has been demonstrated to be a viable conversion technology. Current state-of-the-art systems do not currently produce conversion products in an efficient and economically competitive manner to displace fossil fuels in the energy market. The reactor component of the biomass conversion system is a critical component to achieving efficient and economically viable conversion of biomass to fuel and fuel precursor liquids.

The reactor vessel is the primary component in the thermo-chemical conversion process of organic materials such as wood waste, crop residues and certain municipal waste paper and plastic products into methane and other gasses, bio-oil liquids and solid phase char. The efficiency and economical performance of the reactor vessel is the predominant cost controlling component of the overall processing system. The capability of the reactor component to accept a variety of materials with a broad range of physical and chemical characteristics without retrofit can substantially improve the efficiency and economic operation of the conversion system.

Thus, there is a need for an efficient and effective reactor vessel used in the thermo-chemical conversion of biomass and waste materials.

BRIEF SUMMARY OF THE INVENTION

The present invention satisfies the needs discussed above. The present invention is generally directed toward an apparatus and method for the refinement of waste materials into biological based fuels.

It is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

The present invention is directed toward the thermo-chemical conversion of woody biomass, switch grass, crop residues and various waste materials into combustible gas and/or precursor liquids for subsequent refinement into biological based fuels. Specifically, a reactor vessel of the present invention, referred to as a Cascading Planar Baffle (CPB) Reactor, employs flat planar baffles inside the reactor as heat transfer surfaces. The slope of these internal baffles can be changed by external mechanical means. Changing the slope of these internal surfaces changes the rate at which feedstock materials fall through the reactor vessel. The planar baffles can also be vibrated to initiate motion to the heat transfer surface providing a means to further control the rate of progress of the feedstock material through the reactor vessel. Regulating the residence time of the feedstock in the reactor vessel facilitates the use of a variety of feedstock materials in the same reactor vessel. This control of the rate of movement through the vessel can facilitate using a variety of feedstock materials to tailor the produced gas and liquid fraction percentages and product composition.

Upon reading the above description, various alternative embodiments will become obvious to those skilled in the art. These embodiments are to be considered within the scope and spirit of the subject invention, which is only to be limited by the claims which follow and their equivalents.

DESCRIPTION OF THE INVENTION

The present invention satisfies the needs discussed above. The present invention is generally directed toward an apparatus and method for the refinement of waste materials into biological based fuels.

Figure 1:
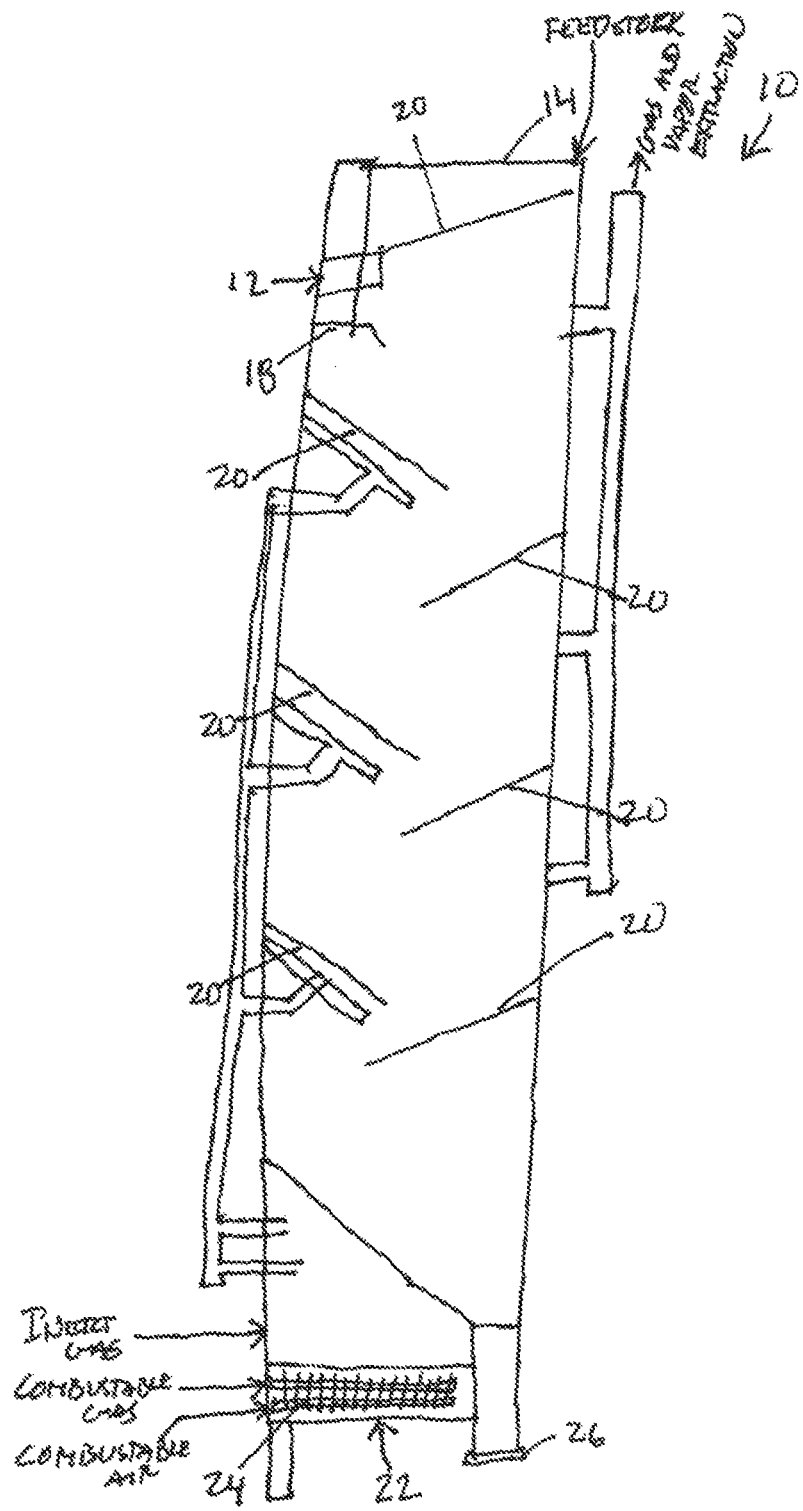
FIG. 1 is a schematic view of an embodiment of the present invention.

As illustrated in FIG. 1, an embodiment of the inventive cascading planar baffle (CPB) reactor 10 is shown. This embodiment of the CPB 10 is generally a rectilinear vessel 12 having a nominal aspect ratio of 1:1:4 (length:width:height). The vessel 12 has a standing tower attitude. Materials to be thermo-chemically processed are fed into the top 14 of the tower through a pressure lock devise that maintains the slight negative internal pressure within the vessel 12 while emitting the feedstock material to a reaction chamber 18. A series of alternating planar baffles 20 are aligned vertically within the reactor chamber 18. The baffles 20 can be oriented from horizontal to nearly vertical from outside of the reactor vessel 12 by mechanical, hydraulic or other means without interrupting the system operations.

As shown, the CPB reactor 10 is capable of heating with and without the enclosed firebox 22. The heating mechanism (not shown) for a standalone CPB reactor without the enclosed firebox 22 would have the combustion burners underneath the CPB reactor. This process scheme would be valid for that were not as dependant on heat integration. Additionally, external vibration devices (not shown) are also used to help assist biomass flow through the reactor as well as provide a means to adjust residence tulles throughout portions of the reactor.

A gas clamber 24 is located at the base of the vessel 12. Heating of the gas in the chamber 24 is done using a fraction of the combustible gas produced by the separation process. An inert gas composed of carbon dioxide, nitrogen or other constituents that has oxygen percentage of 5% or less is heated in the gas chamber 24. This inert gas is fed into the reactor vessel 12 beneath the planer baffles 20. The gas can be released as a steady stream or pulsed to induce a vibration to the planar baffles 20. The planar baffles 20 provide the heat of separation by contact with the feedstock. The inert gas also performs as the heat transfer media to the feedstock. The feedstock material cascades across the planar baffle surface and moves downward via gravity through the reactor chamber 18. The capability to change the slope angle of the internal baffles, vary the inert gas feed rate and induce vibration to the baffle surfaces provided the capability to control the retention time of the feedstock in the reaction chamber.

The capability to control the rate of conversion and the composition of the produced gases and liquids derived from the separation of the feedstock material is a critical cost element in the biomass to fuel process. Controlling the retention time of the feedstock in the reaction chamber 18 also increases the separation efficiency and percent conversion. The solid residual that are generated during the separations process exits the reaction chamber through a pressure lock device 26 at the base of the 12. The rate of movement of the feedstock material vertically through the reactor vessel 12 can be regulated by changing the slope of the planar baffle surface and varying the rate of vibration of the baffles via the pulsed gas flow. Controlling the temperature of the inert gas, the rate of gas feed into the reactor vessel and the retention tune in the vessel, facilitates efficient conversion and separation of the produced product's physical and compositional characteristics.

Figure 2:
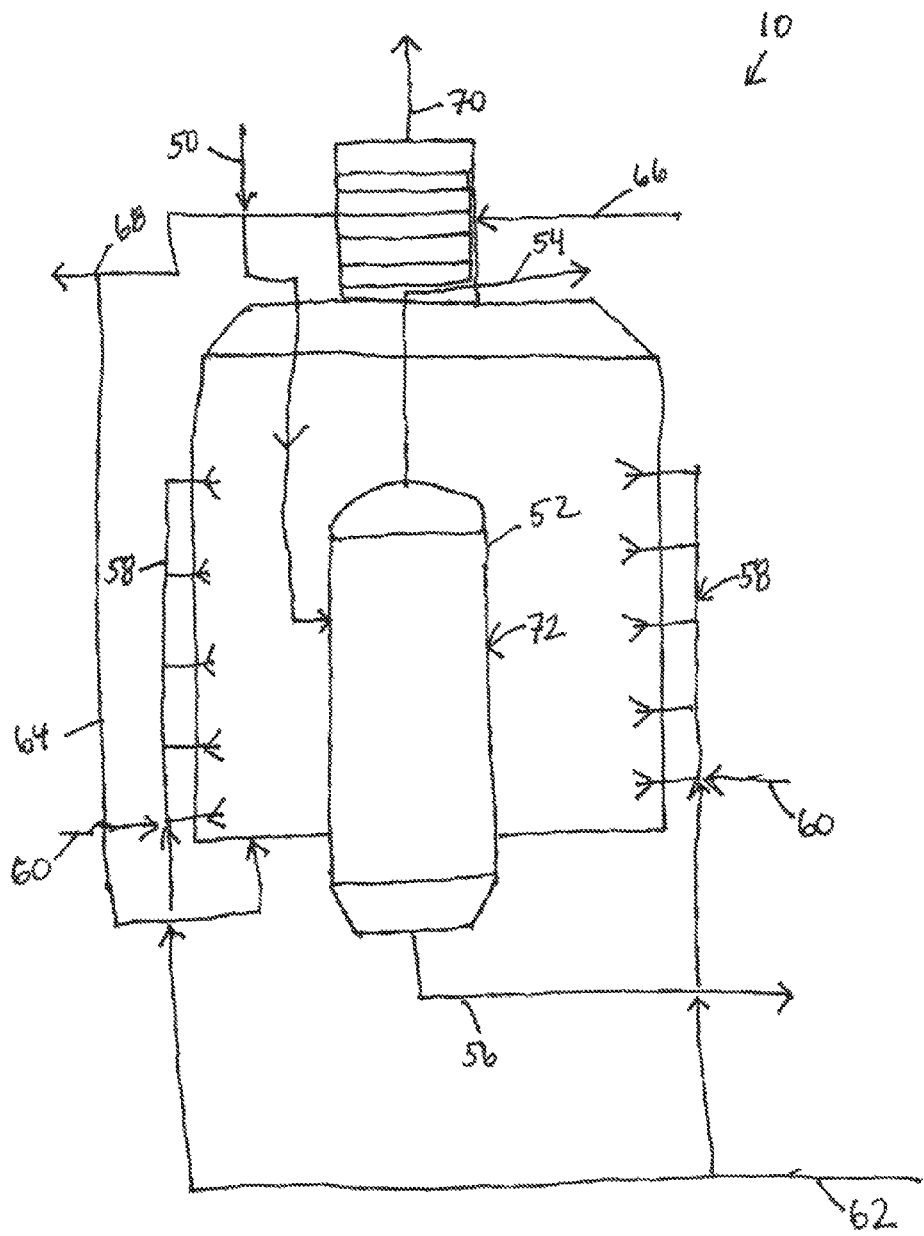
FIG. 2 is a schematic view of a second embodiment of the present invention.

An embodiment for the CPB reactor 10 in a Pyrolysis process is shown in FIG. 2 and described as such. The biomass feed 50 into the CPB reactor 10 will penetrate the walls of the firebox and then attach to a mounted flange on the side of the pyrolysis reactor 52. The syngas produced 54 in the CPR reactor 10 must also penetrate the fired vessel 72 to exit the system. The char produced 56 in the reactor 10 exits the system through the bottom of the reactor, which is not housed inside the fired vessel 72. The wall burners 58 control the off gas temperature of the reactor 10 by adjusting the air 60 and fuel 62 going to the wall burners and injecting steam 64 into the fired vessel base. Due to the higher temperature requirements for the reaction, there exists a large quantity of enthalpy in the heat left over teams the bottom portion of the fired vessel. This enthalpy is captured in the top part of the fired vessel by feeding boiler feedwater 66 and converting it into low pressure steam 68. The steam 68 produced from the heat can be used for power generation or used to heat other equipment inside a production facility. The combustion gasses from the wall burners exit the system as a vent stream 70 that will need to be environmentally mitigated as needed before final release to the atmosphere.

The embodiment of the CPB reactor 10 design addresses current problem areas that have been identified with reactors utilized in the thermo-chemical conversion of biomass and waste (most notably Pyrolysis reactors). The current leading design for these types of reactors, are configurations with fluid bed or circulating fluid bed based designs. These designs require high inert gas through-put, and in some designs, use of an inert material such as sand to maintain the fluidized conditions. Due to the heterogeneity of various feedstocks, maintaining fluidized conditions is a significant problem area. Since size and density differences in the feedstock can cause anisotropic flow conditions in the fluidized bed, plugging of the gas distribution inlets is a common occurrence. These fluid bed reactors require pretreatment of feedstock materials to achieve homogeneity, and low moisture content in the feedstock materials. These complex fluid bed systems commonly handle a high percentage of inert hot materials (sand) and a low percentage of the feedstock being processed. This percent mixture helps maintain internally consistent heat and flow conditions. Costs associated with construction and operation of these systems is high which results in high bio-oil production costs that are not competitive with petroleum crude prices.

The CPB reactor 10 employs a series of paired planer baffles in the reactor vessel as reaction surfaces. Each internal baffle is capable of adjusting the slope angle which is used to change the rate of movement of the feedstock within the reactor. Changing the residence time of the feedstock in the vessel to allow full conversion of various feedstocks to either torrefied solids, bio-oil liquids or syn-gas. Moreover, the invention features the CPB reactor partially housed inside a fired vessel with vertical wall burners. The portion of the reactor that isn't housed inside the fired vessel is the very bottom of the reactor. This is done to reduce tar formations of the char/torrefied solids that occur at pyrolysis temperatures (350-550 degrees C.) and extended residence times. The remaining portion of the reactor is completely housed inside the fired vessel. The reactor is located in the center of the fired vessel at a measurable distance from the side walls of the fired vessel. The number of wall burners inside the fired vessel are selected such that the reactor is uniformly heated at varying flow rates into the reactor.

Feedstock is fed externally through the firebox and into the top of the CPB reactor vessel and cascades across the planar surfaces where the hot metal provides the heat of reaction to the feedstock. Pulsed inert recycled conversion gas (syngas) is injected in strategic locations gas injection beneath the planar surfaces and into the bottom of the reactor to produce a low velocity vibration to the baffles which keeps the biomass moving across the hot contact surface and downward through the vessel. In addition to providing a means to keep biomass moving through the reactor, the recycled conversion gas also provides energy into the system and helps maintain overall system continuity. Externally mounted vibration devices are also used in congruency with the internal baffle slope angle to increase or decrease the residence time of the biomass on the various baffles located in the reactor. Staging residence time with vibration and slope angle provides additionally flexibility in the biomass conversion to a particular end product. Combustion burners located externally to the reactor inside an encompassing firebox use biooil or syngas generated by the conversion process to provide a heat source for raising the temperature of the CPB reactor. The implementation of this heating mechanism dramatically increases the overall efficiency of the system by utilizing both radiant and convective heat transfer mechanisms.

Vapors from the combustion are routed to the top of the firebox where additional heat recovery is used to produce steam for the upstream drying operations. Reaction gas with entrained char/torrefied solid is removed from the top of the CPB reactor which penetrates the external firebox. Char/torrefied solids are removed at the base of the reactor by gravity feed into a conveying rotary valve and transfer system. The transfer system operates in an inert environment and transfers the char/torrefied solids into an inert cooling hopper where it is cooled to a safe temperature to eliminate fire risks. The reactor off gas with entrained char/torrefied solid matter is processed through a cyclone where additional solids are collected and sent to the cooling hopper. For the Pyrolysis process, the char free reaction gas is then sent to a process cooler for condensing of the Biooil to be re-used in the firebox for the heating of the CPB reactor. The Biooil free reaction gas is then sent back to the front of the process where it is passed through the feedstock as part of the drying process.

In a Torrefaction process, the reaction gas is sent directly from the cyclone to the front of the process since the reaction gas would not host any Biooil or condensables due to the lower operating temperature. In both processes (Torrefaction and Pyrolysis), the reaction gas once clean of char/torrefied solids and Biooil (Pyrolysis only) is sent upstream to aid in the drying of the initial feedstock. Passing the reaction gas through the feedstock offers two inherently advantages to the process. The first advantage of this processing scheme is enthalpy in the reaction gas is given to the feedstock for aid in the drying process. The second advantage is the filtering of the reaction gas by the feedstock. The feedstock inherently has the ability to remove residual tars and other contaminants in the reaction gas which improves the efficiency and longevity of the downstream reaction gas turbine.

The CPB reactor design has several advantages over current reactor designs. Feedstock uniformity will no longer be a predominant requirement, size and density variability of the feedstock can be tolerated. This is a key benefit of this design; in other reactor designs uniformity of the feedstock material is required for process functionality. The CPB reactor would facilitate utilization of regionally diverse, multiple, variable and complex feedstock materials. The reactor has a distributive mass design that affords good heat transfer from the contact surfaces to the feedstock and can handle solid particulate impurities without interruption of the process. Utilizing two heat transfer mechanisms by surrounding the CPB reactor with the firebox, offers additional heat transfer efficiency and provides additional heat integration by providing steam for upstream drying operations. Additionally, as previously mentioned, the passing of reaction gas through the feedstock offers the distinct advantages of heat integration and filtering characteristics.

The CPB reactor design offers the flexibility to be used for a host of reaction parameters. This flexibility lends the reactor design the capability to perform biomass conversion at conditions favorable for torrefaction through conditions that favor fast pyrolysis. These conditions also include both positive and negative pressure scenarios. The lack of internally circulating media such as sand allows the CPB reactor to be much smaller and have less moving parts than traditional fluidized bed reactors. The smaller size of the reactor with less operating equipment promotes it as a leader for mobilized pyrolysis and torrefaction processes.

The development of a low complexity low cost reactor vessel will make the production of torrefed solids, bio-gas and bio-oil biofuels and bio-fuel precursors cost competitive with fossil fuels. The capability to alter the internal structure of the reactor vessel during continuous operation is the critical element. By altering the internal structure of the reactor vessel the residence time of the feedstock materials in the reactor can be changed to accommodate the physical and chemical characteristics of the feedstock material. The heat integration concepts with the utilization of the enclosed firebox heating mechanism as well as enthalpy exchange with the reaction gas for feedstock drying, offers enhanced efficiency beyond the traditional offerings for reactors utilized in the thermo-chemical conversion of biomass and waste. This capability provides the efficiency and economic viability needed to be cost competitive with fossil fuels. The size of the CPB reactor offers the distinct advantage of being less capital and operating intensive as the reactor does not require a circulating solid media and the enhanced heat transfer efficiency offers a significant size reduction.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification.

The invention claimed is:

1. A cascading planar baffle reactor comprising:
   a rectilinear vessel defining a reaction chamber, the rectilinear vessel having a top and a base defining a reaction chamber;
   a plurality of alternating planar baffles aligned vertically within the reaction chamber;
   a plurality of planer baffles with an offset and opposing orientation affixed to the interior sides of the reaction chamber, wherein feedstock to be processed enter the reaction chamber from the top and move downward by gravity and the rate of movement is controlled by the internal configuration of said plurality of planar baffles;
   a gas chamber located at the base of the rectilinear vessel, the gas chamber having means for receiving inert gas, wherein the inert gas is heated within the gas chamber; and
   means for providing the heated inert gas from the gas chamber to the reaction chamber.

2. The cascading planar baffle reactor of claim 1 further comprising:
   a pressure lock device located along the top of the rectilinear vessel for receiving feedstock and emitting the feedstock into the reaction chamber, said pressure lock device maintaining a slight negative internal pressure within the rectilinear vessel while emitting the feedstock material into the reaction chamber.

3. The cascading planar baffle reactor of claim 1 wherein the slope angle of said plurality of planar baffles can be controlled.

4. The cascading planar baffle reactor of claim 3 wherein said angle of the interior planar baffles can be controlled from outside of the rectilinear vessel.

5. The cascading planar baffle reactor of claim 3 wherein said angle of the interior planar baffles can be changed from horizontal to near vertical.

6. The cascading planar baffle reactor of claim 1 wherein said plurality of planar baffles can be vibrated.

7. The cascading planar baffle reactor of claim 6 wherein said plurality of planar baffles can be vibrated using pulsed gas released from beneath the baffle.

8. The cascading planar baffle reactor of claim 1 wherein said plurality of planar baffles can be vibrated using mechanical means.

9. The cascading planar baffle reactor of claim 1 wherein said plurality of planar baffles can be vibrated and the vibration amplitude and frequency can be controlled from outside of the vessel.

10. The cascading planar baffle reactor of claim 1 wherein said plurality of planar baffles provide flat surfaces as heat transfer surfaces.

11. The cascading planar baffle reactor of claim 1 wherein said plurality of planar baffles provide as reaction surfaces.

* * * * *